(12) United States Patent
Carreon et al.

(10) Patent No.: US 9,093,849 B2
(45) Date of Patent: Jul. 28, 2015

(54) UNIVERSAL CHARGING DOCK WITH A WALL MOUNT

(71) Applicant: Superior Communications, Inc., Irwindale, CA (US)

(72) Inventors: Kristopher Carreon, Montebello, CA (US); Soo Youn Park, Tustin, CA (US); Mervyn Cheung, Alhambra, CA (US)

(73) Assignee: Superior Communications, Inc., Irwindale, CA (US)

( * ) Notice: Subject to any disclaimer, the term of this patent is extended or adjusted under 35 U.S.C. 154(b) by 308 days.

(21) Appl. No.: 13/735,684

(22) Filed: Jan. 7, 2013

(65) Prior Publication Data
US 2014/0191707 A1 Jul. 10, 2014

(51) Int. Cl.
| H02J 7/00 | (2006.01) |
| H04M 1/04 | (2006.01) |
| H01M 10/44 | (2006.01) |
| H01R 31/06 | (2006.01) |

(52) U.S. Cl.
CPC ............ *H02J 7/0044* (2013.01); *H02J 7/0032* (2013.01); *H02J 7/0052* (2013.01); *H04M 1/04* (2013.01); *H01M 10/44* (2013.01); *H01R 31/06* (2013.01); *H02J 2007/0062* (2013.01)

(58) Field of Classification Search
CPC .................................................. G06F 1/1632
USPC .................................................. 320/107, 115
See application file for complete search history.

(56) References Cited

U.S. PATENT DOCUMENTS

| 7,014,486 B1* | 3/2006 | Wu et al. ........................ 439/248 |
| 7,066,752 B2* | 6/2006 | Hsu et al. ....................... 439/248 |
| 7,090,521 B2* | 8/2006 | Nishio et al. ................... 439/248 |
| 8,113,873 B1* | 2/2012 | Sarraf ............................ 439/533 |
| 2007/0103112 A1* | 5/2007 | Casalena et al. .............. 320/112 |
| 2010/0285847 A1* | 11/2010 | Greer et al. ................... 455/573 |
| 2011/0134601 A1* | 6/2011 | Sa ............................ 361/679.43 |
| 2013/0002193 A1* | 1/2013 | Aldana et al. ................. 320/107 |

* cited by examiner

*Primary Examiner* — Drew A Dunn
*Assistant Examiner* — Christopher Nettles
(74) *Attorney, Agent, or Firm* — Snell & Wilmer LLP

(57) ABSTRACT

A universal charging dock for charging a mobile device includes a base portion defining an opening, a back support portion connected to the base portion, a connector housing within the opening, and a wall mount module. The base portion has grooved sidewalls adjacent a track within the opening, and the connector housing has a grooved track that locks into the track and allows lateral movement along the track. The grooved track further allows the connector housing to rotate within the opening. A male connector, for connecting to a charging port of the mobile device, extends from the connector housing and may move vertically into or out of the connector housing to adjust an extension of the male connector. The universal charging dock may also be placed on either side, to achieve portrait or landscape orientations.

20 Claims, 10 Drawing Sheets

UNIVERSAL CHARGING DOCK WITH A WALL MOUNT

BACKGROUND

1. Field

The present invention relates to a universal charging dock with a wall mount for charging devices.

2. Description of Related Art

Mobile devices, such as smartphones, have accessories, such as charging docks, which are specific to each mobile device model. "Universal" charging docks currently available are relatively large in size and are not compatible with every device to be truly "universal." Current charging docks achieve universal compatibility through interchangeable modules which are device-specific. Separate pieces specific to each mobile device must be purchased. When a different mobile device is used, another specific module is required. Under these circumstances, the charging docks are not truly "universal."

Thus, there is a need for true universal compatibility with a wide selection of mobile devices to dock the mobile device and charge its battery at the same time without requiring device-specific modules.

SUMMARY

The present application relates to a universal charging dock for mobile devices. In one embodiment, the universal charging dock includes a base portion defining an opening and having grooved sidewalls adjacent a track within the opening, a back support portion connected to the base portion, a connector housing having a grooved track and being disposed within the opening such that the grooved track locks into the track to allow the connector housing to move along the track and the grooved track allows the connector housing to rotate within the opening, a male connector for connecting to a charging port of the mobile device, extending from the connector housing and configured to shift into or out of the connector housing to adjust an extension of the male connector.

In one embodiment, the universal charging dock includes a base portion having a top surface defining an opening, a bottom surface opposite the top surface, a back surface connected to the bottom surface, and grooved sidewalls adjacent a track within the opening, a Universal Serial Bus (USB) connector on the back surface, a back support portion integrated with the top surface and the back surface, a connector housing having a grooved track and being disposed within the opening such that the grooved track locks into the track to allow the connector housing to move along the track and the grooved track allows the connector housing to rotate within the opening, and a male micro-USB connector for connecting to a chanting port of the mobile device, extending from the connector housing and configured to shift into or out of the connector housing to adjust an extension of the male micro-USB connector.

In one embodiment, the universal charging dock includes a base portion defining an opening and having grooved sidewalls adjacent a track within the opening, a Universal Serial Bus (USB) connector connected to the base portion, a back support portion connected to the base portion, a bottom housing configured to receive the USB connector, a connector housing having a grooved track and being disposed within the opening such that the grooved track locks into the track to allow the connector housing to move along the track and the grooved track allows the connector housing to rotate within the opening, a male micro-USB connector for connecting to a charging port of the mobile device, extending from the connector housing and configured to shift into or out of the connector housing to adjust an extension of the male micro-USB connector.

BRIEF DESCRIPTION OF THE DRAWINGS

The features and advantages of the present application will become more apparent from the detailed description set forth below when taken in conjunction with the drawings, wherein.

DETAILED DESCRIPTION

Apparatus, systems and/or methods that implement the embodiments of the various features of the present application will now be described with reference to the drawings. The drawings and the associated descriptions are provided to illustrate some embodiments of the present application and not to limit the scope of the present application. Throughout the drawings, reference numbers are re-used to indicate correspondence between referenced elements.

Figure 1:
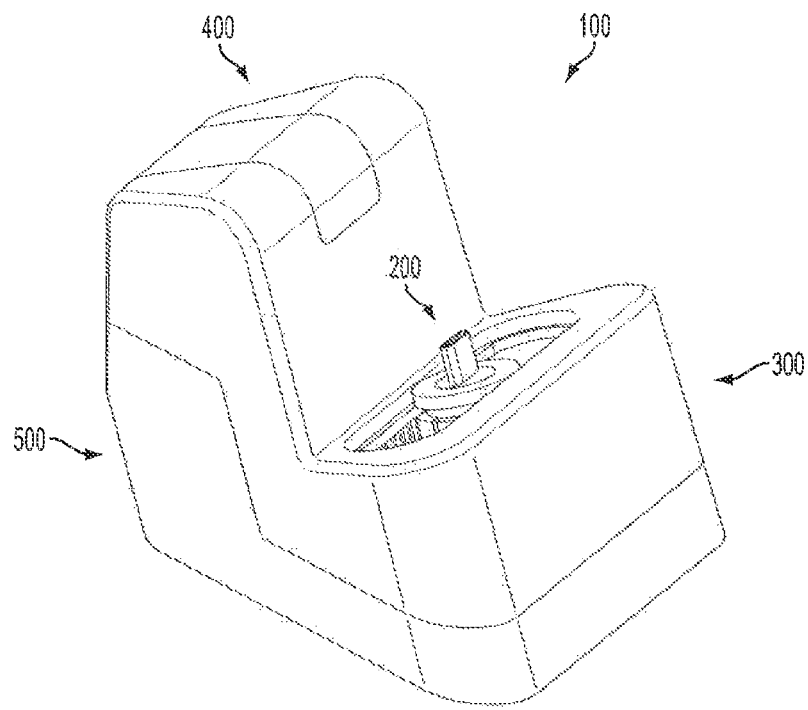
FIG. 1 is a perspective view of the universal charging dock with a wall mount according to an embodiment of the invention.

In one embodiment, as seen in FIG. 1, a universal charging dock 100 includes a base portion 300, a back support portion 400, a connector housing 200, and a wall mount module 500.

Figure 2:
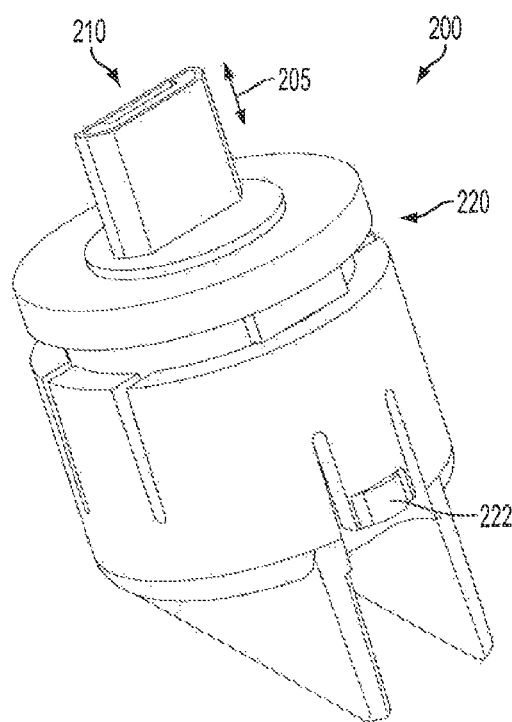
FIG. 2 is a perspective view of the connector housing illustrating the vertical movement of the male connector according to an embodiment of the invention.
Figure 15:
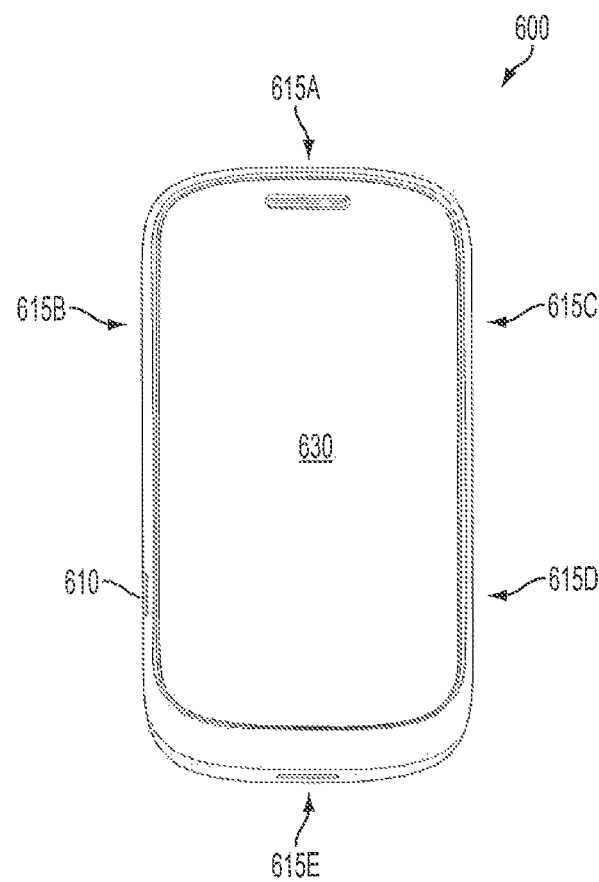
FIG. 15 illustrates the mobile device with possible charging port locations according to an embodiment of the invention.

FIG. 2 depicts the connector housing 200 separated from the base portion 300. The connector housing 200 houses a male connector 210. The male connector 210 connects to a charging port of a mobile device, such as a charging port 610 of a mobile device 600 as seen in FIG. 15. In FIG. 2, the male connector 210 is a micro-USB connector, but in alternative embodiments the male connector 210 may be a different charging connector, such as a USB connector.

Figure 16:
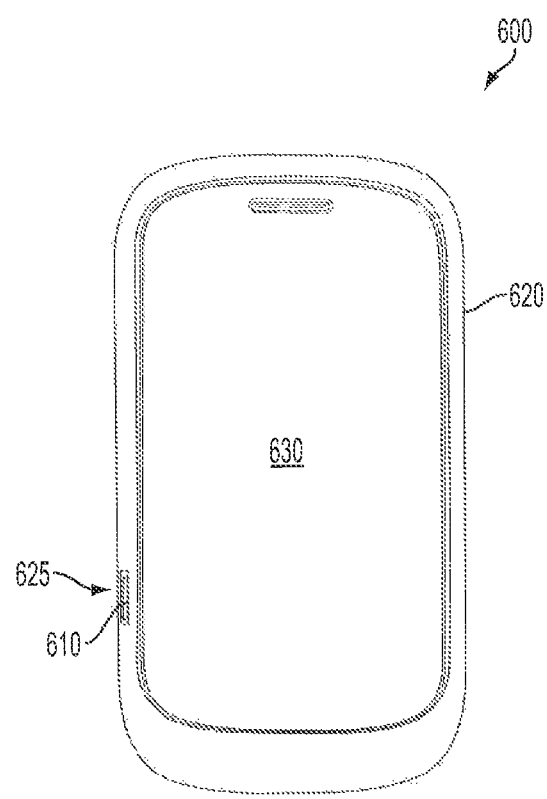
FIG. 16 illustrates the mobile device with a case according to an embodiment of the invention.

The male connector 210 extends from the connector housing 200. The male connector 210 may also shift into or out of the connector housing 200, as indicated by the arrow 205. When the connector housing 200 is disposed in the base portion 300, and the universal charging dock 100 sits upright, the male connector 210 shifts in a vertical direction to adjust the extension of the male connector 210. This vertical movement accommodates various thicknesses of mobile devices. For example, the mobile device 600 having a protective case 620, as seen in FIG. 16, may be thicker than the mobile device 600 without a protective case, as seen in FIG. 15. The added thickness may require an extended male connector 210 to reach the charging port 610 within the protective case 620. In one embodiment, the male connector 210 may be adjustable up to about 4 millimeters total in vertical distance.

The connector housing 200 also includes a grooved track 220 and a notch 222. In FIG. 2, the connector housing 200 has a cylindrical shape. The grooved track 220 is disposed along the round portion of the connector housing 200. The cylindrical Shape and the grooved track 220 allow for more types of motion in addition to the vertical motion of the male connector 210, such as rotation and lateral movement as will be discussed further below.

Figure 3:
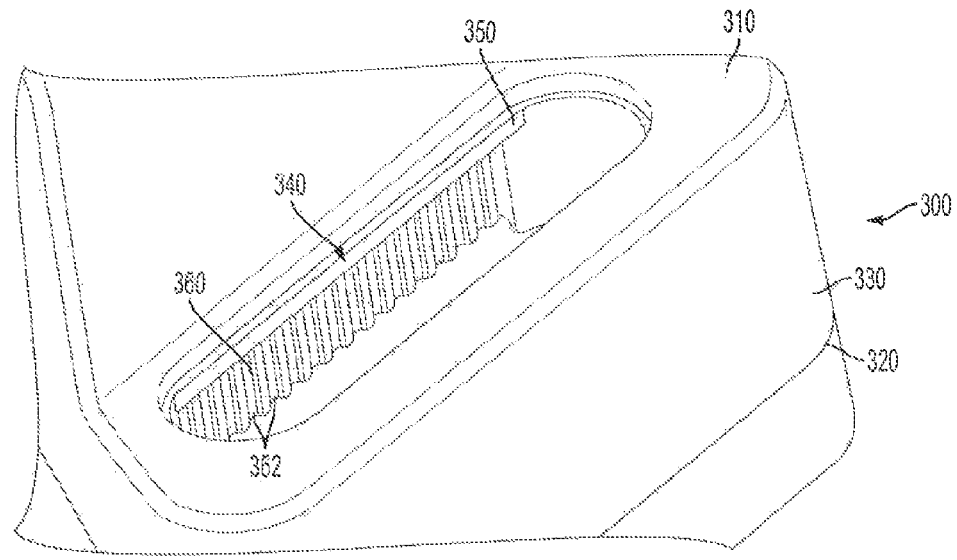
FIG. 3 is a close-up view of the track within the opening of the base portion of the universal charging dock according to an embodiment of the invention.

FIG. 3 presents a close-up view of an opening 340 defined by the base portion 300. The base portion 300 includes a top surface 310 and a bottom surface 320 (not visible in FIG. 3) opposite the top surface 310. A front face 330 connects the top surface 310 and the bottom surface 320.

Figure 4:
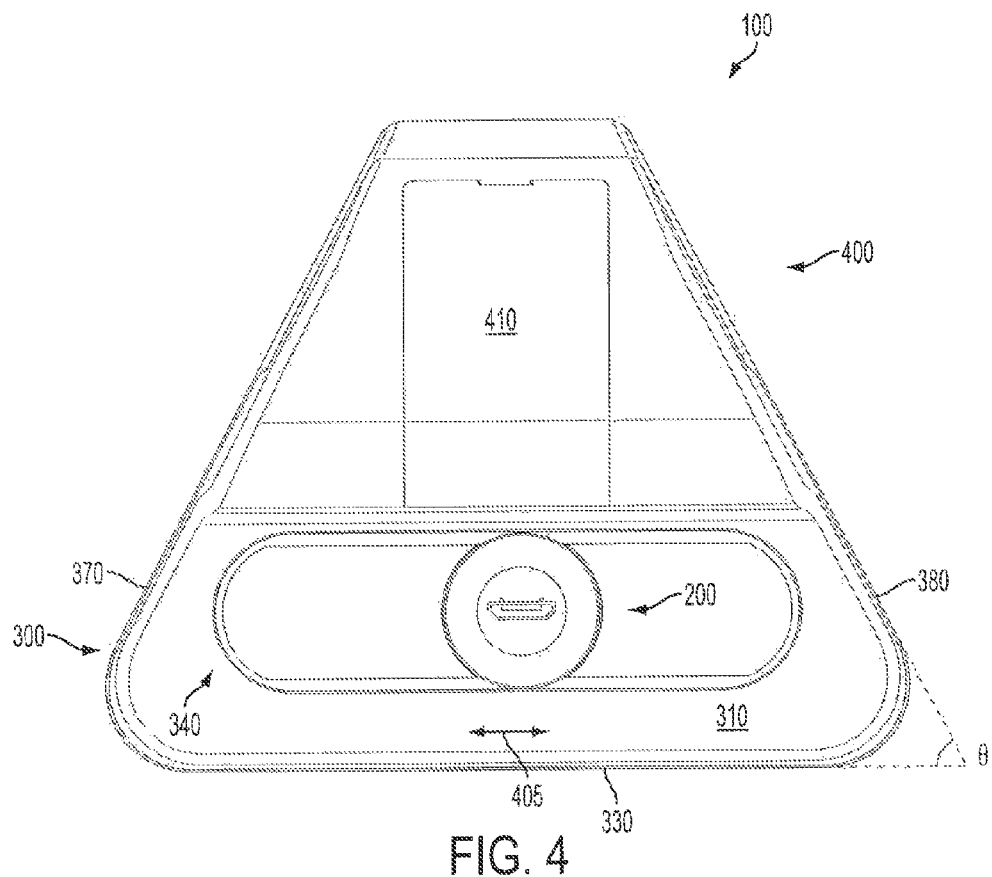
FIG. 4 is a top view of the universal charging dock illustrating the lateral movement of the connector housing according to an embodiment of the invention.

The opening 340 is defined in the top surface 310. In FIGS. 3 and 4, the opening 340 is an elongated circle, although the opening 340 may have different shapes in alternative embodiments. The shape of the opening 340 corresponds to the shape of the connector housing 200 to allow the connector housing 200 to move within the opening 340. Because the connector housing 200 in FIG. 2 has a cylindrical shape, the opening 340 can accommodate the connector housing 200 shifting and rotating within the opening 340.

A track 350 and a grooved sidewall 360 are within the base portion 300 and exposed by the opening 340. The track 350 traces the opening 340 and may be disposed below the top surface 310. The grooved sidewall 360 is adjacent to and immediately below the track 350. The grooved sidewall 360 has grooves 362 and substantially spans the width of the opening 340. As seen in FIG. 3, the grooved sidewall 360 spans the straight section of the opening 340, and further spans a significant portion of the width of the base portion 300. Another grooved sidewall 360 may be opposite the grooved sidewall 360 (not visible in FIG. 3).

FIG. 4 presents a top-down view of the universal charging dock 100. A sliding portion 410 of the back support portion 400 as well as the top surface 310 of the base portion 300 can be seen. FIG. 4 illustrates the connector housing 200 placed within the opening 340 of the base portion 300. The grooved track 220 of the connector housing 200 locks into the track 350 of the base portion 300. Because the connector housing 200 sits along the track 350, the housing connector 200 is free to move laterally along the track, as indicated by arrow 405. The grooves 362 also interlock with the grooved track 220 to allow the connector housing 200 to lock into various positions when laterally adjusted. The notch 222 of the connector housing 200 locks with the grooves 362 so that the connector housing 200 may be laterally adjusted, but will not shift unintentionally.

The lateral movement allows the male connector 210 to adjust to the location of the charging port 610 of the mobile device 600. The location of the charging port 610 may vary from mobile device to mobile device. FIG. 15 illustrates other possible charging port locations 615A-E, such as on the top (615A), the top-left (615B), the top-right (615C), bottom-right (615D), the bottom (615E), or other locations. The adjustability of the male connector 210 allows the mobile device 600 to remain centered on the base portion 300 (see FIG. 8) regardless of the location of the charging port.

The top view of the base portion 300 depicts an outline of a shape of the base portion 300. A left side 370 and a right side 380 meet with the front face 330 at rounded corners. However, the left side 370 and the right side 380 form an angle θ with the front face 330. As will be discussed further below (see FIGS. 9-11), the angle θ may be optimized for placing the universal charging dock 100 on its side.

Figure 5A:
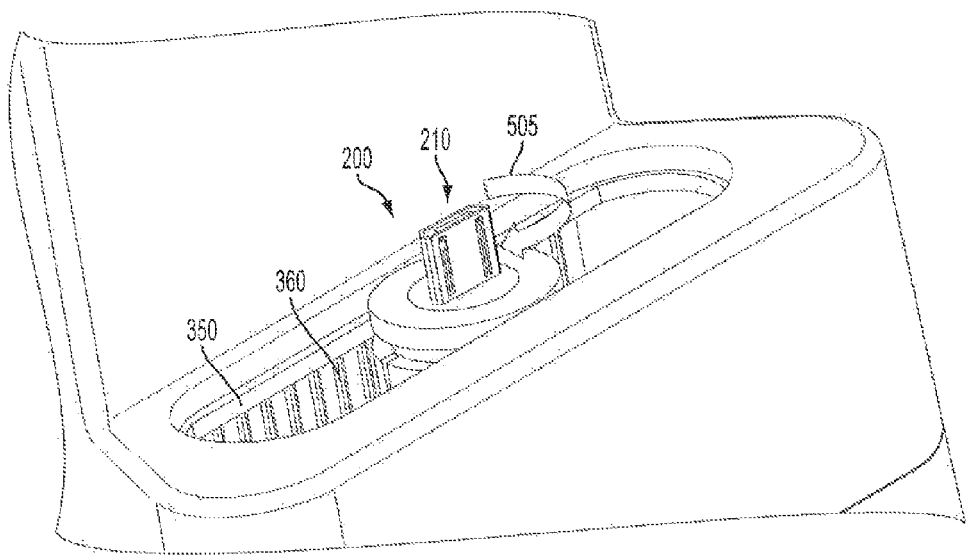
FIGS. 5A and 5B illustrate the rotation of the male connector according to an embodiment of the invention.
Figure 5B:
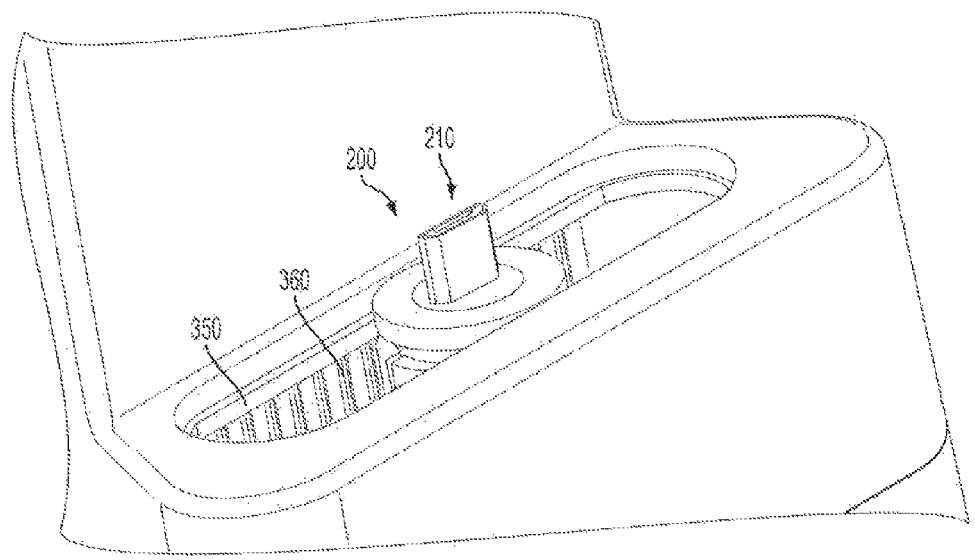

FIGS. 5A and 5B illustrate the rotation of the connector housing 200. The grooved track 220 of the connector housing 200 interlocks with the track 350 of the base portion 300 to allow the connector housing 200 to rotate within the opening 340, as indicated by the arrow 505, without falling out or becoming misaligned. FIGS. 5A and 5B depict the two orientations for the male connector 210 that correspond with the two possible orientations of the charging port of the mobile device 600. The 180 degrees of rotation is sufficient to accommodate the two orientations. The grooved track 220 further prevents the connector housing 200 from rotating more than 180 degrees in order to prevent components from breaking within the universal charging dock 100. The male connector 210 can rotate in place without moving laterally within the opening 340. This rotation allows a screen display 630 of the mobile device 600 (see FIG. 8) to face forward while docked.

Figure 6:
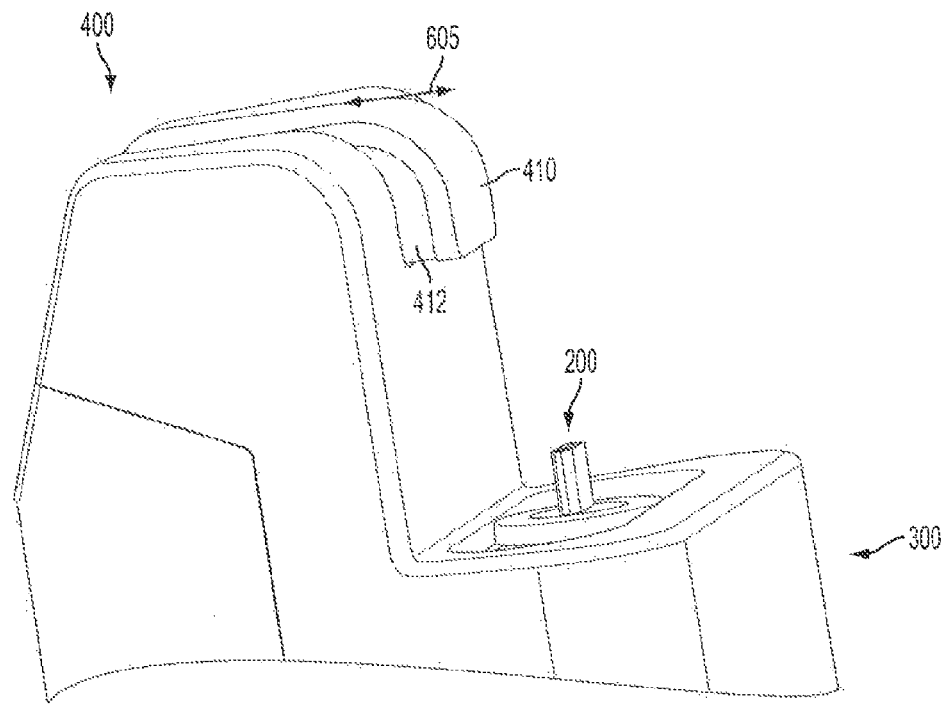
FIG. 6 illustrates the sliding portion of the back support portion according to an embodiment of the invention.
Figure 7:
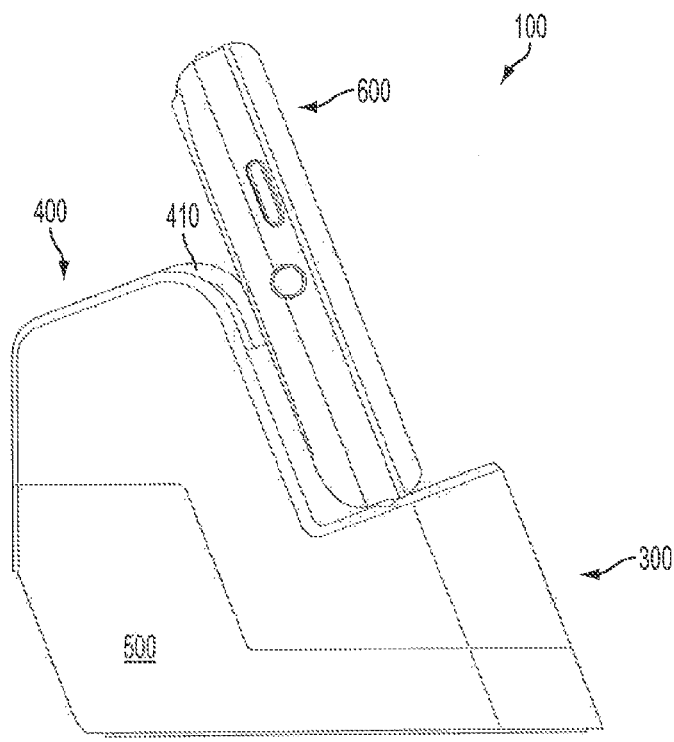
FIG. 7 is a side profile view of the universal charging dock having the back support portion adjusted to provide support to a mobile device seated in the male connector according to an embodiment of the invention.

FIGS. 6 and 7 illustrate the sliding portion 410. As indicated by arrow 605, the sliding portion 410 may be adjusted laterally. The sliding portion 410 can adjust to accommodate various thicknesses of the mobile device 600. For example, the back support portion 400 may not extend far enough towards the connector housing 200 to provide back support to a thin smartphone. The sliding portion 410, which may be held in place with notched sidewall 412, can be adjusted to ensure that the mobile device 600 is held in place and also relieves stress exerted on the male connector 210. In FIG. 7, the sliding portion 410 is adjusted to provide back support to the mobile device 600, keeping the back side of the mobile device 600 generally parallel to the back support portion 400. Because the mobile device 600 does not plug into the male connector 210 at an angle, damage to the male connector 210 may be prevented.

Figure 8:
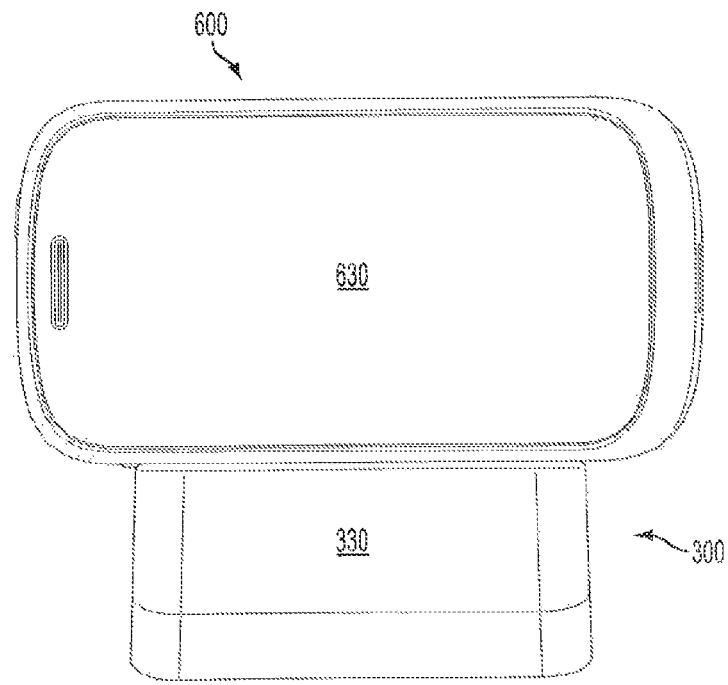
FIG. 8 is a front view of the universal charging dock with a mobile device docked in the universal charging dock according to an embodiment of the invention.

As described above, the male connector 210 can achieve three types of motion or movement: lateral movement, vertical movement, and rotational movement. These three types of motion or movement allow the universal charging dock 100 to achieve universality by plugging into any mobile device charging port while keeping the screen display facing forward and centered on the universal charging dock 100. The lateral movement allows the mobile device 600 to remain centered on the base portion 300 even if the charging port 610 is not centered with respect to the mobile device 600. For example, FIG. 8 depicts the mobile device 600 placed on its left side on the top of the base portion 300. The charging port 610 of the mobile device 600 may be located on the lower left (not shown in FIG. 8), such that it is not centered with respect to the mobile device 600. The connector housing 200 may be laterally adjusted to allow the male connector 210 to align with the charging port 610 when the mobile device 600 is centered on the base portion 300. Thus, the male connector 210 can align with the various charging port locations 615A-E depicted in FIG. 15.

The vertical movement allows the male connector 210 to be adjusted to accommodate various thicknesses of the mobile device 600. For example, the mobile device 600 may be covered in the case 620, as seen in FIG. 16. A case opening 625 exposes the charging port 610, but the added thickness of the case 620 places the charging port 610 within the case opening 625. When flush with the connector housing 200, the male connector 210 may be prevented from fully plugging into the charging port 610 because of the added thickness of the case 620. The male connector 210 can be vertically adjusted to accommodate the added thickness of the case 620.

The 180 degree rotation allows the male connector 210 to accommodate either of the two possible orientations of the charging port 610. As seen in FIGS. 5A and 5B, the male connector 210 can be rotated without otherwise shifting its position. The male connector 210 can be rotated to ensure the screen display 630 of the mobile device 600 faces forward when docked, as seen in FIG. 8. The three types of motion or movement therefore allow the male connector 210 to adjust to accommodate virtually any location of the charging port 610 of the mobile device 600 while keeping the mobile device 600 centered and the screen display 630 facing forward on the base portion 300.

Figure 10:
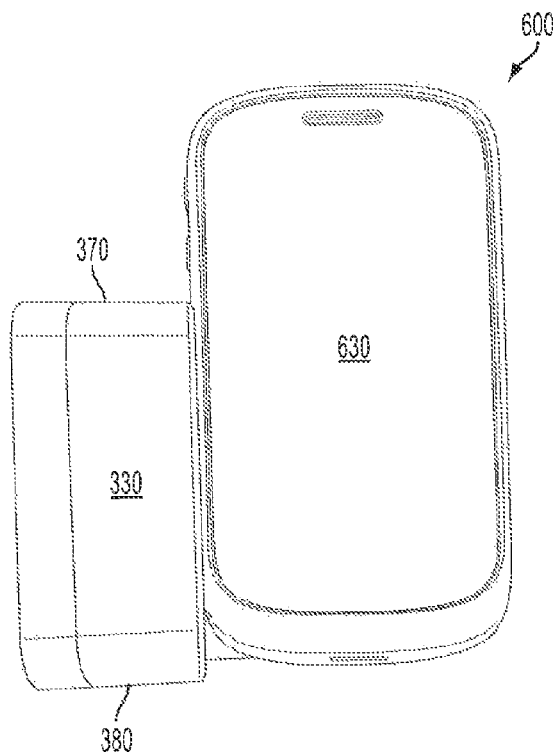
FIG. 10 is an illustration of the universal charging dock on its side position with a mobile device according to an embodiment of the invention.

Although FIGS. 1-8 generally depict the universal charging dock 100 as upright, the overall geometry of the universal charging dock 100 allows it to be placed on its side for "portrait" or "landscape" orientations. A portrait orientation may refer to the longer edge of the screen being vertically oriented, as seen in FIG. 10. A landscape orientation may refer to the longer edge of the screen being horizontally oriented, as seen in FIG. 8. If the universal charging dock 100 remains upright, the orientation is limited by the location of the charging port 610. By placing the universal charging dock 100 on either side, other orientations may be achieved.

Figure 9:
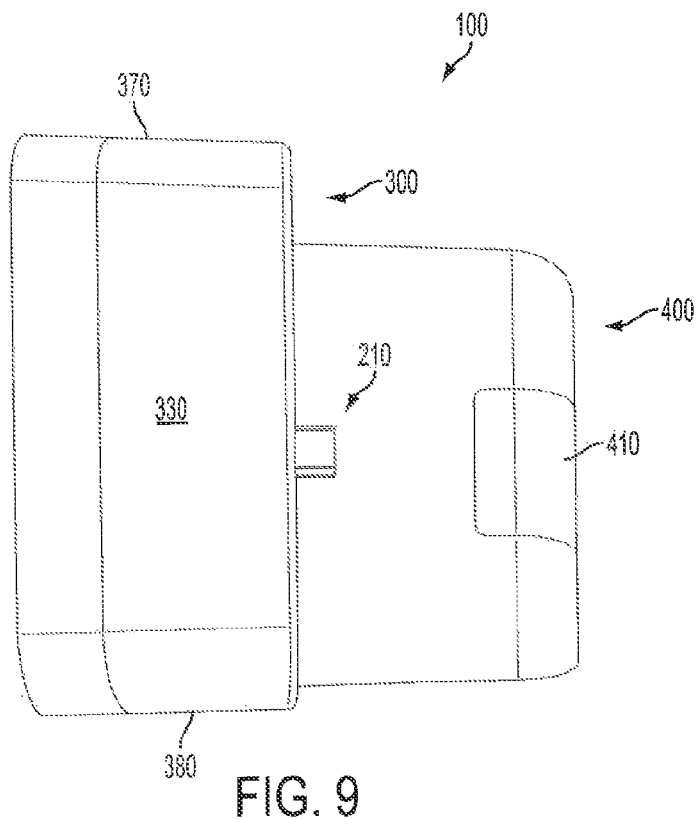
FIG. 9 is an illustration of the universal charging dock on its side position according to an embodiment of the invention.

FIG. 9 depicts the universal charging dock 100 placed on its right side 380. The male connector 210 retains its position without shifting when the universal charging dock 100 is placed on its side. The adjustments to the sliding portion 410 are also unaffected by placing the universal charging dock 100 on its side. The universal charging dock 100 may alternatively be placed on its left side 370.

FIG. 10 illustrates the mobile device 600 docked to the universal charging dock 100 placed on its side. Because the universal charging dock 100 is placed on its right side 380, the mobile device 600 cannot extend below the right side 380 to be centered with respect to the base portion 300, as seen in FIG. 8. However, the male connector 210 can be adjusted to align with the new position of the charging port 610. Thus, the universal charging dock 100 maintains universal compatibility even when placed on its side.

Figure 11:
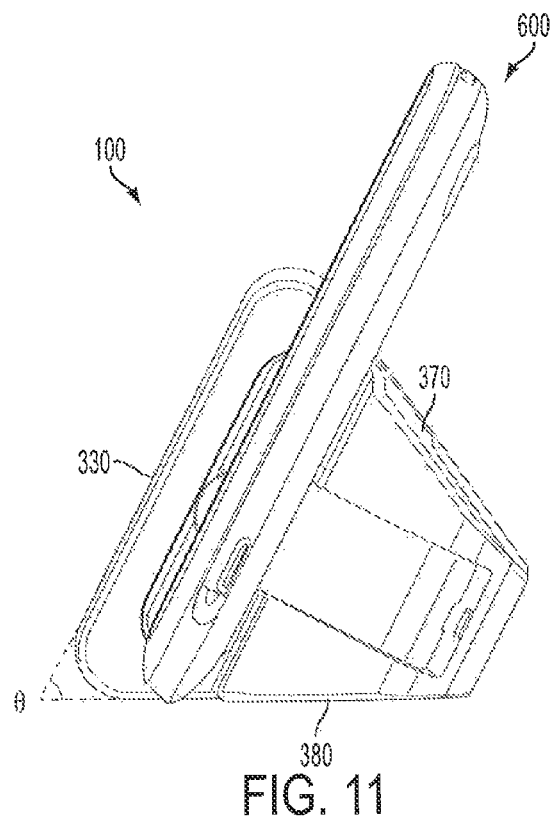
FIG. 11 is an illustration of the universal charging dock on its side position, showing a viewing angle according to an embodiment of the invention.

FIG. 11 shows a side view of the universal charging dock 100 and the mobile device 600 when the universal charging dock 100 is on its side. The front face 330 and the right side 380 form an angle θ. The angle θ ensures the mobile device 600 maintains a proper viewing angle when the universal charging dock 100 is on its side. In FIGS. 10 and 11, the desired viewing angle is 60 degrees, which allows the screen display 630 to be seen at a comfortable angle for the user. The angle θ is 60 degrees to maintain the desired viewing angle of 60 degrees. The 60 degrees also allow the universal charging dock 100 to retain stability while on its side and support the mobile device 600 at the 60 degree viewing angle. The front face 330 and the left side 370 may also form the angle θ.

Figure 12:
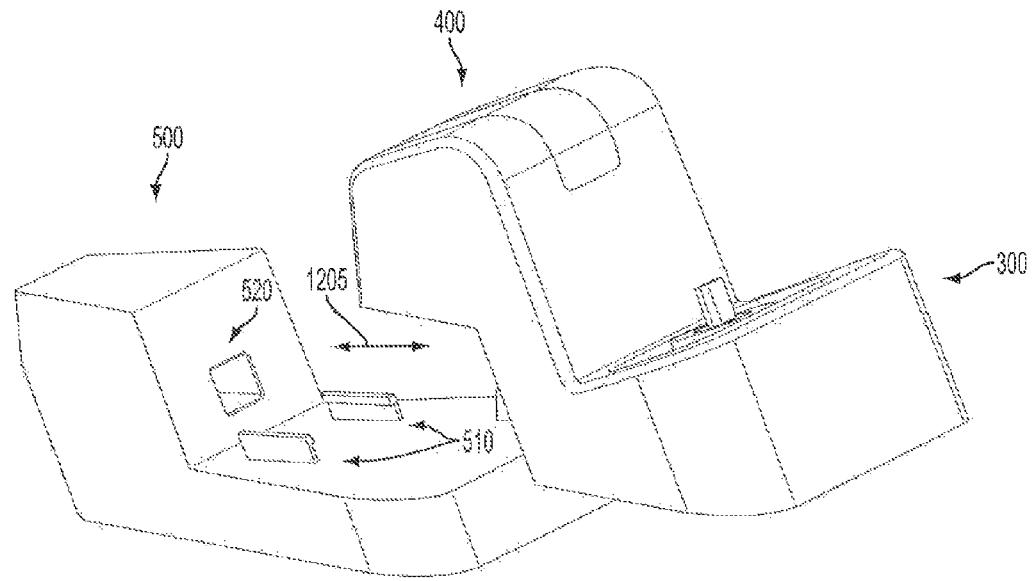
FIG. 12 illustrates the removal of the interchangeable wall mount module according to an embodiment of the invention.
Figure 13:
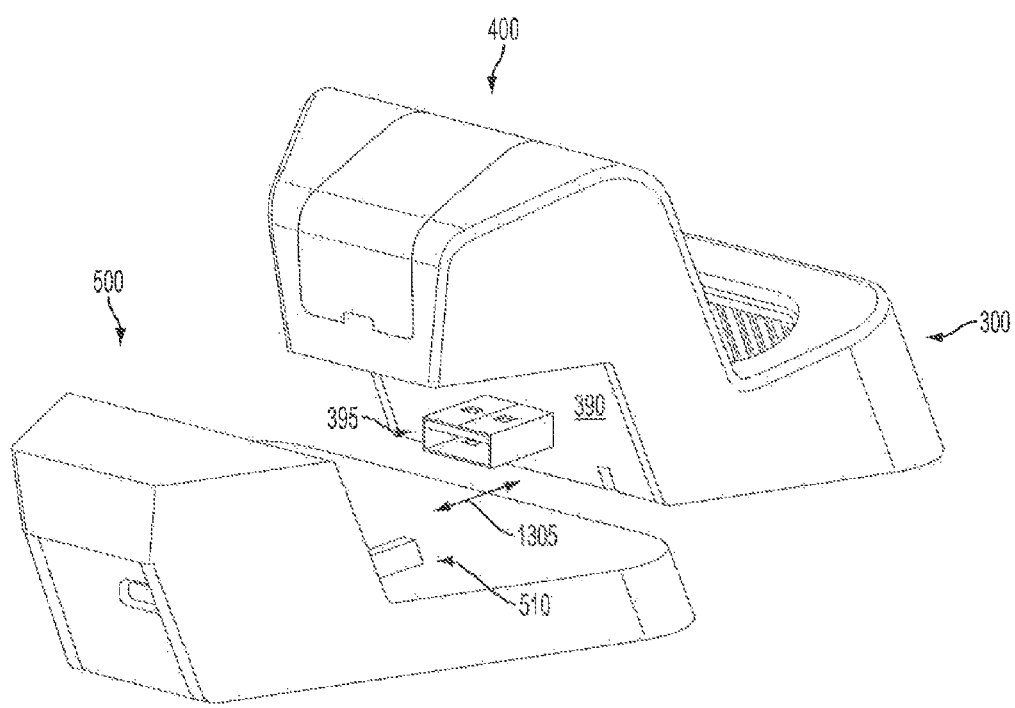
FIG. 13 illustrates a reverse angle of the removal of the interchangeable wall mount module according to an embodiment of the invention.
Figure 14:
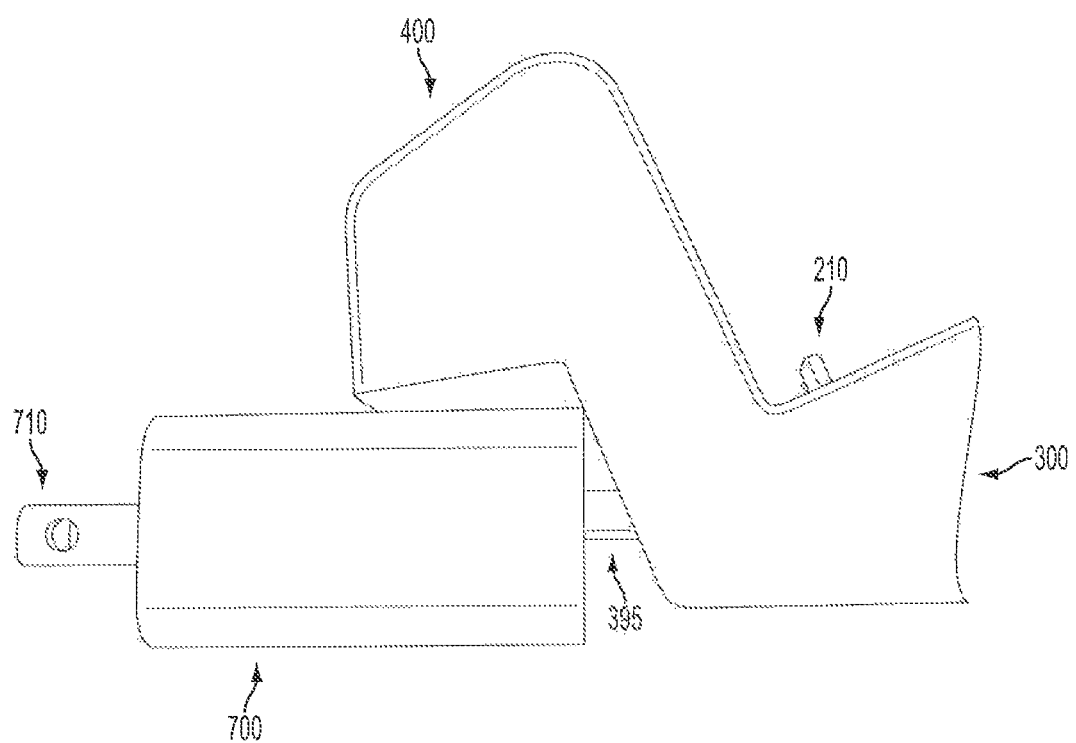
FIG. 14 illustrates the universal charging dock with a standard travel charger unit connected to the base portion according to an embodiment of the invention.

FIGS. 12-14 illustrate the detachable wall mount module 500. As seen in FIGS. 12-14, the base portion 300 and the back support portion 400 may be integrated as one main housing. The wall mount module 500 may form a separate housing that is detachable from the base portion 300 and the back support portion 400, as indicated by arrows 1205 (FIG. 12) and 1305 (FIG. 13). The wall mount module includes rails 510 and a female power connector 520. The back surface 390 of the base portion 300 has a male power connector 395. The male power connector 395 is guided by the rails 510 into the female power connector 520, to provide a power connection to the male connector 210. In FIGS. 12-14, the male power connector 395 and the female power connector 520 are male and female USB connectors, respectively. In alternative embodiments, the male power connector 395 and the female power connector 520 may be other types of connectors capable of delivering power. The wall mount module 500 may then be connected to a power source, such as a standard alternating current (AC) electrical outlet.

The wall mount module 500 may advantageously be replaced by other modules. For example, the wall mount module 500 may be replaced by another wall mount module which can be connected directly to any AC electrical outlet.

In FIGS. 12-14 the use of USB connectors for the male power connector 395 and the female power connector 520 allows the wall mount module 500 to be replaced with other USB charging units. In FIG. 14, the wall mount module 500 is replaced by a travel charger unit 700. The travel charger unit 700 may be any standard travel charger unit with a USB port. The travel charger unit 700 receives the male power connector 395. The travel charger unit 700 has prongs 710 for directly connecting to an AC electrical outlet. Because standard USB-based travel charger units are widely available, the universal charging dock 100 is compatible with various wall mounting options.

Skilled artisans may implement the described functionality in varying ways for each particular application, but such embodiment decisions should not be interpreted as causing a departure from the scope of the disclosed apparatus and/or methods.

The previous description of examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The elements and uses of the above-described embodiments can be rearranged and combined in manners other than specifically described above, with any and all permutations within the scope of the application. The described embodiments are to be considered in all respects only as illustrative and not restrictive and the scope of the application is, therefore, indicated by the appended claims rather than by the foregoing description. All changes which come within the meaning and range of equivalency of the claims are to be embraced within their scope. In addition, the application is not limited to the illustrated embodiments, and all embodiments of the application need not necessarily achieve all the advantages or purposes or possess all characteristics identified herein.

What is claimed is:

1. A universal charging dock for charging a mobile device, comprising:
    a base portion defining an opening and having grooved sidewalls adjacent a track within the opening;
    a back support portion connected to the base portion;
    a connector housing having a grooved track and being disposed within the opening such that the grooved track locks into the track to allow the connector housing to move along the track and the grooved track allows the connector housing to rotate within the opening; and
    a male connector for connecting to a charging port of the mobile device, extending from the connector housing and configured to shift into or out of the connector housing to adjust an extension of the male connector.

2. The universal charging dock of claim 1, wherein a front side of the base portion is wider than a back side of the base portion.

3. The universal charging dock of claim 1, wherein the connector housing locks into the grooved sidewalls to hold a position.

4. The universal charging dock of claim 1, further comprising a sliding portion configured to extend from the back support portion and held by notched grooves.

5. The universal charging dock of claim 1, further comprising a wall mount module connected to the base portion.

6. The universal charging dock of claim 1, further comprising a travel charger unit connected to the base portion.

7. The universal charging dock of claim 1, wherein the male connector is a micro-USB (Universal Serial Bus) connector.

8. A universal charging dock for charging a mobile device, comprising:
    a base portion having a top surface defining an opening, a bottom surface opposite the top surface, a back surface connected to the bottom surface, and grooved sidewalls adjacent a track within the opening;
    a Universal Serial Bus (USB) connector on the back surface;
    a back support portion integrated with the top surface and the back surface;
    a connector housing having a grooved track and being disposed within the opening such that the grooved track locks into the track to allow the connector housing to move along the track and the grooved track allows the connector housing to rotate within the opening; and
    a male micro-USB connector for connecting to a charging port of the mobile device, extending from the connector housing and configured to shift into or out of the connector housing to adjust an extension of the male micro-USB connector.

9. The universal charging dock of claim 8, wherein the base portion further has a front face connected to the top surface and the bottom surface, a left side connected to the top surface and the bottom surface and connected to the front face at a 60 degree angle, and a right side connected to the top surface and the bottom surface and connected to the front face at a 60 degree angle.

10. The universal charging dock of claim 8, wherein the connector housing locks into the grooved sidewalls to hold a position.

11. The universal charging dock of claim 8, further comprising a sliding portion configured to extend from the back support portion and held by notched grooves.

12. The universal charging dock of claim 8, further comprising a wall mount module connected to the base portion.

13. The universal charging dock of claim 8, wherein the connector housing can rotate up to 180 degrees within the opening.

14. The universal charging dock of claim 8, wherein the connector housing has a cylindrical shape, such that the male micro-USB connector extends from a face of the connector housing.

15. A universal charging dock for charging a mobile device, comprising:
    a base portion defining an opening and having grooved sidewalls adjacent a track within the opening;
    a Universal Serial Bus (USB) connector connected to the base portion;
    a back support portion connected to the base portion;
    a bottom housing configured to receive the USB connector;
    a connector housing having a grooved track and being disposed within the opening such that the grooved track locks into the track to allow the connector housing to move along the track and the grooved track allows the connector housing to rotate within the opening; and
    a male micro-USB connector for connecting to a charging port of the mobile device, extending from the connector housing and configured to shift into or out of the connector housing to adjust an extension of the male micro-USB connector.

16. The universal charging dock of claim 15, wherein the bottom housing has at least one rail to guide the USB connector into the bottom housing.

17. The universal charging dock of claim 15, wherein the bottom housing is configured to directly connect to an electrical outlet.

18. The universal charging dock of claim 15, wherein the bottom housing is a travel charger unit.

19. The universal charging dock of claim 15, further comprising a sliding portion configured to extend from the back support portion and held by notched grooves.

20. The universal charging dock of claim 15, wherein the opening has a rounded shape.

* * * * *